US012407971B2

(12) United States Patent
Olson et al.

(10) Patent No.: US 12,407,971 B2
(45) Date of Patent: Sep. 2, 2025

(54) EAR-WEARABLE ELECTRONIC DEVICE INCLUDING MULTI-FUNCTION REMOVAL HANDLE

(71) Applicant: STARKEY LABORATORIES, INC., Eden Prairie, MN (US)

(72) Inventors: Kyle Olson, St. Louis Park, MN (US); Sidney A. Higgins, Maple Grove, MN (US); Jay Stewart, Eden Prairie, MN (US); Fue Yang, Minneapolis, MN (US); Casey Murray, Waconia, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 295 days.

(21) Appl. No.: 17/948,464

(22) Filed: Sep. 20, 2022

(65) Prior Publication Data

US 2023/0098807 A1 Mar. 30, 2023

Related U.S. Application Data

(60) Provisional application No. 63/290,621, filed on Dec. 16, 2021, provisional application No. 63/250,637, filed on Sep. 30, 2021.

(51) Int. Cl.
*H04R 1/10* (2006.01)
*H04R 25/00* (2006.01)

(52) U.S. Cl.
CPC ......... *H04R 1/1058* (2013.01); *H04R 1/1025* (2013.01); *H04R 1/1041* (2013.01);
(Continued)

(58) Field of Classification Search
CPC .. H04R 1/1058; H04R 25/609; H04R 1/1025; H04R 1/1041; H04R 1/105; H04R 25/65
(Continued)

(56) References Cited

U.S. PATENT DOCUMENTS 7,446,720 B2 11/2008 Victorian et al.
10,034,107 B2 7/2018 Nielsen
(Continued)

FOREIGN PATENT DOCUMENTS

EP 3180927 A1 6/2017

OTHER PUBLICATIONS

European Patent Application No. 22198114, filed Sep. 27, 2022; European Search Report issued Mar. 3, 2023; 10 pages.

*Primary Examiner* — Sean H Nguyen
(74) *Attorney, Agent, or Firm* — Mueting Raasch Group

(57) ABSTRACT

An ear-wearable electronic device comprises a shell and a faceplate connected to the shell. Electronic circuitry and a power source are respectively disposed in the shell. A removal handle includes a proximal end connected to the faceplate. First and second electrical conductors extend along the removal handle and comprise first and second proximal ends coupled to the electronic circuitry. An electrical contact module is disposed at a distal end of the removal handle. The electrical contact module comprises a substrate. A first electrical contact is mounted on, or supported by, the substrate and coupled to a first distal end of the first electrical conductor. A second electrical contact is mounted on, or supported by, the substrate and coupled to a second distal end of the second electrical conductor.

23 Claims, 6 Drawing Sheets

(52) U.S. Cl.
CPC ........... *H04R 1/105* (2013.01); *H04R 25/609* (2019.05); *H04R 25/65* (2013.01)

(58) Field of Classification Search
USPC ........................................................ 381/374
See application file for complete search history.

(56) References Cited

U.S. PATENT DOCUMENTS

| | | | |
|---|---|---|---|
| 10,687,156 | B2 | 6/2020 | Polinske et al. |
| 2009/0208046 | A1 | 8/2009 | Schmidt |
| 2012/0170781 | A1 * | 7/2012 | Klemenz ............... H02J 7/0042 381/323 |
| 2014/0254844 | A1 | 9/2014 | Shennib |
| 2015/0146901 | A1 | 5/2015 | Richardson et al. |
| 2019/0268706 | A1 | 8/2019 | Solum |

* cited by examiner

*Figure 3A*
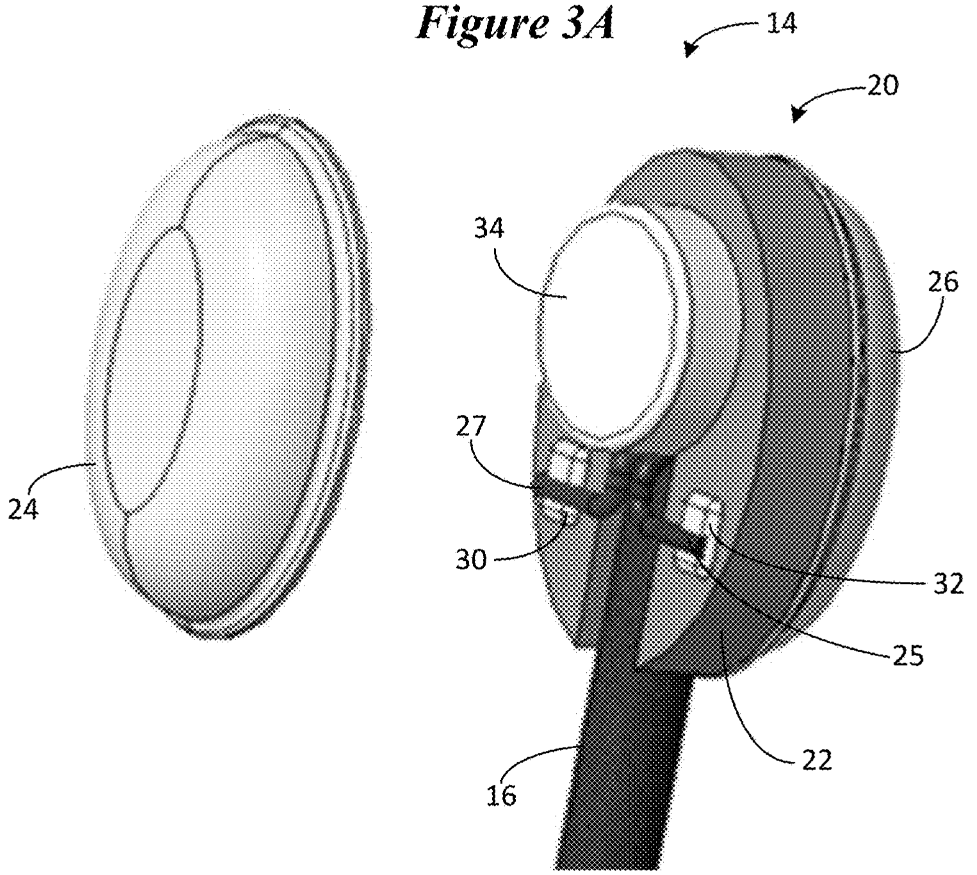
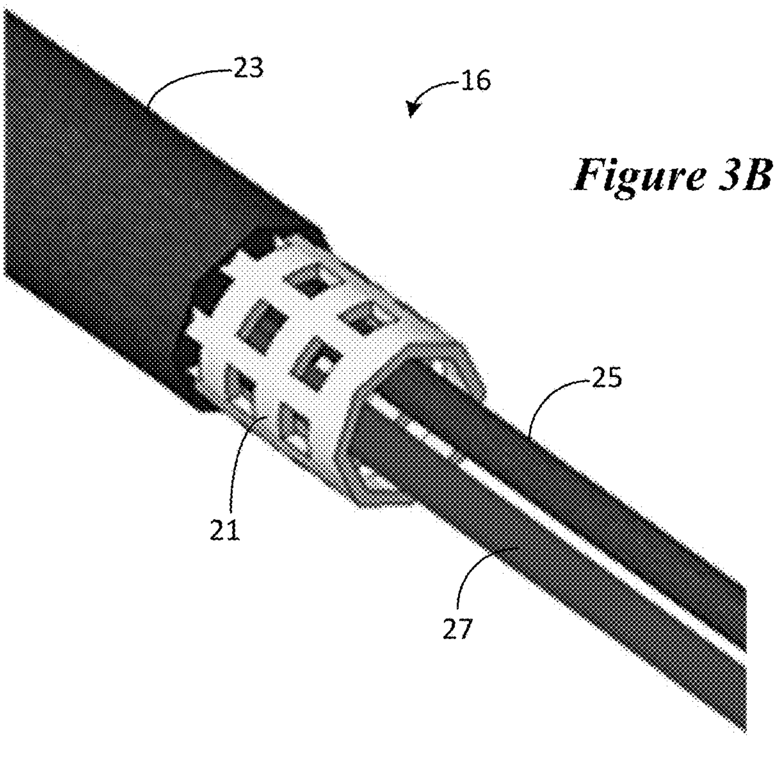
*Figure 3B*

EAR-WEARABLE ELECTRONIC DEVICE INCLUDING MULTI-FUNCTION REMOVAL HANDLE

CROSS-REFERENCE TO RELATED APPLICATIONS

This application claims the benefit of U.S. Provisional Application No. 63/250,637, filed Sep. 30, 2021, and U.S. Provisional Application No. 63/290,621, filed Dec. 16, 2021, the content of which is incorporated herein by reference in their respective entireties.

TECHNICAL FIELD

This application relates generally to removal handles for ear-wearable devices, such devices including ear-wearable electronic devices, hearing aid, hearables, earbuds, personal amplification devices, and physiologic/biometric monitoring devices.

SUMMARY

Some embodiments are directed to an ear-wearable electronic device comprising a shell and a faceplate connected to the shell. Electronic circuitry and a power source are respectively disposed in the shell. A removal handle includes a proximal end connected to the faceplate. First and second electrical conductors extend along the removal handle and comprise first and second proximal ends coupled to the electronic circuitry. An electrical contact module is disposed at a distal end of the removal handle. The electrical contact module comprises a substrate. A first electrical contact is mounted on, or supported by, the substrate and coupled to a first distal end of the first electrical conductor. A second electrical contact is mounted on, or supported by, the substrate and coupled to a second distal end of the second electrical conductor.

Some embodiments are directed to an ear-wearable electronic device comprising a shell and a faceplate connected to the shell. Electronic circuitry and a rechargeable power source are respectively disposed in the shell. A removal handle is connected to the faceplate. First and second electrical conductors extend along the removal handle and comprise first and second proximal ends coupled to the electronic circuitry. An electrical contact module is disposed at a distal end of the removal handle. The electrical contact module comprises a substrate. A first electrical contact is mounted on, or supported by, the substrate and coupled to a first distal end of the first electrical conductor. A second electrical contact is mounted on, or supported by, the substrate and coupled to a second distal end of the second electrical conductor. The first and second electrical contacts are configured as touch sensor contacts and charge contacts for charging the rechargeable power source.

Some embodiments are directed to a method implemented using an ear-wearable electronic device comprising a shell and a faceplate connected to the shell. The method comprises, with the device deployed in the wearer's ear, activating a switch of an electrical contact module disposed at a distal end of a removal handle connected to the faceplate in response to contact between at least one of the wearer's fingers and the electrical contact module. The method also comprises, with the device removed from the wearer's ear, recharging a rechargeable power source of the device via the electrical contact module.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 3A shows various components of a multi-function removal handle in accordance with any of the embodiments disclosed herein;

FIG. 3B shows various components of a multi-function removal handle in accordance with any of the embodiments disclosed herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
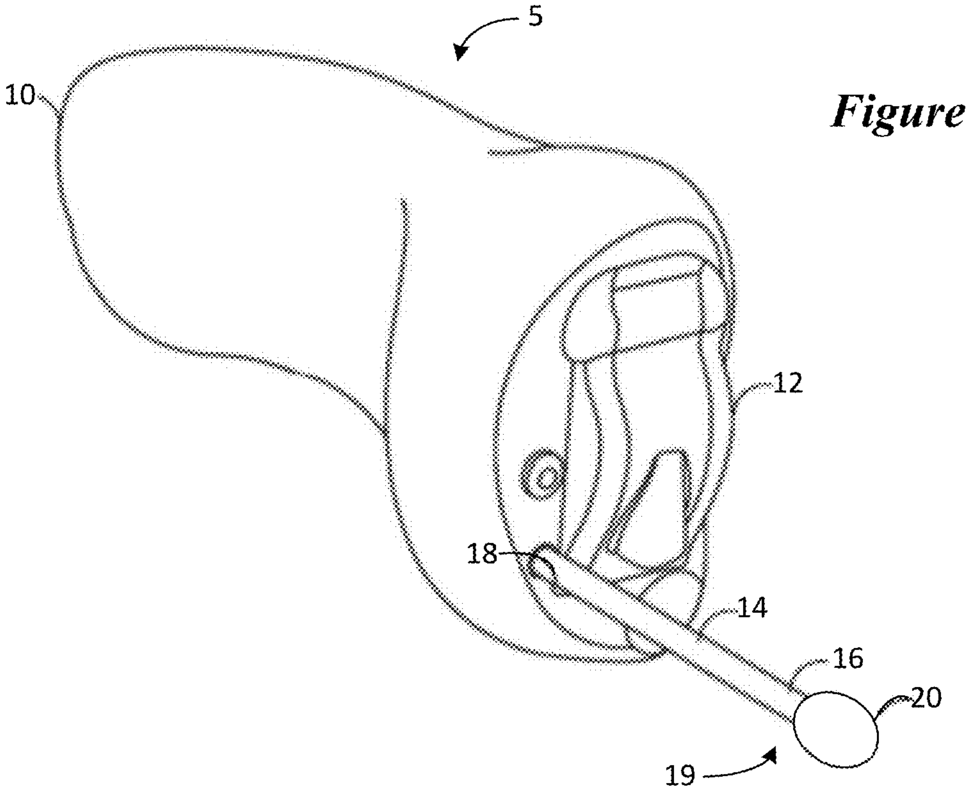
FIG. 1 shows a representative ear-wearable electronic device which includes a multi-function removal handle in accordance with any of the embodiments disclosed herein.

Removal handles for hearing aids and other in-canal electronic devices provide a gripping structure which allows easy extraction of the device from a wearer's ear. Removal handles are also called pull-cables, pull-cords, and pull-members. Embodiments of the disclosure are directed to removal handles with enhanced functionality.

In some implementations, a multi-function removal handle comprises a user-actuatable touch switch. In other implementations, the multi-function removal handle comprises charge contacts configured to couple to charging contacts of a charging unit. In further implementations, the multi-function removal handle comprises a user-actuatable touch switch and charge contacts configured to couple to charging contacts of a charging unit. In some implementations, the charge contacts are self-orienting, such that the charge contacts automatically assume a preferred orientation (e.g., electrical polarity) when placed in the charging unit. In other implementations, the positioning of the charge contacts can be arbitrary, due to rectifying circuitry coupled to the charge contacts.

In further implementations, the multi-function removal handle includes a metal core tube through which electrical conductors pass. The metal core tube provides enhanced strength for the removal handle, which can be subjected to significant tensile and torsional forces when pulled on by the device wearer. In some implementations, the multi-function removal handle includes a metal core tube which serves as a radiating element of an antenna of the ear-wearable electronic device. In other implementations, the multi-function removal handle includes an outer sleeve of conductive material that serves as a radiating element of an antenna of the ear-wearable electronic device. The outer conductive sleeve can be covered by a protective coating, such as a coating to prevent oxidation.

The multi-function removal handle can incorporate one or more of these and other advantageous features disclosed herein. Embodiments of the disclosure provide for custom rechargeable hearing devices and other ear-wearable electronic devices (e.g., standard non-rechargeable hearing devices) which provide for enhanced removal handle functionality in a space-saving manner.

Many custom in-canal devices are simply too space limited or reside too deeply in the ear canal for a pushbutton to be effective. Such devices include in-the-ear (ITE), in-the-canal (ITC), completely-in-the-canal (CIC), and invisible-in-canal (IIC) type hearing devices. In cases where a pushbutton does fit and is accessible, such custom in-canal devices often press against the tragus causing soreness and long-term wearer that the user must except to enjoy the added functionality.

Typically, charging contacts reside on the faceplate of custom in-canal devices which is presently a space constraint component that further limits fit rate and comfort shaping by their presence. The faceplate location also limits design options and increases size of the charger while also making the creation of a reliable Travel Charger all but impossible. The addition of wires and Kevlar reinforcement in a removal handle weaken the cross-sectional sheer strength of the removal handle by the necessary thinning of the wall or co-extrusion polymer to maintain the desired sectional diameter. Embodiments of ear-wearable electronic devices which incorporate a multi-function removal handle address these and other shortcomings in conventional removal handle technology.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-wearable electronic device comprises a shell and a faceplate connected to the shell, electronic circuitry and a power source respectively disposed in the shell, a removal handle having a proximal end connected to the faceplate, first and second electrical conductors extending along the removal handle and comprising first and second proximal ends coupled to the electronic circuitry, and an electrical contact module disposed at a distal end of the removal handle. The electrical contact module comprises a substrate, a first electrical contact mounted on, or supported by, the substrate and coupled to a first distal end of the first electrical conductor, and a second electrical contact mounted on, or supported by, the substrate and coupled to a second distal end of the second electrical conductor.

Example Ex2. The device according to Ex1, wherein the electrical contact module defines a user-actuatable switch.

Example Ex3. The device according to Ex1 or Ex2, wherein the switch defines a single function switch.

Example Ex4. The device according to Ex1 of Ex2, wherein the switch defines a multiple function switch.

Example Ex5. The device according to one or more of Ex1 to Ex4, wherein the power source comprises a rechargeable power source, and the electrical contact module defines a user-actuatable switch and the first and second electrical contacts define first and second charge contacts configured to facilitate charging of the rechargeable power source.

Example Ex6. The device according to one or more of Ex1 to Ex4, wherein the power source comprises a rechargeable power source, and the first and second electrical contacts define first and second charge contacts configured to facilitate charging of the rechargeable power source.

Example Ex7. The device according to one or more of Ex1 to Ex6, comprising a magnet disposed on or in the substrate, wherein the magnet is configured to magnetically interact with a magnet of a charging unit so as to self-orient the electrical contact module on the charging unit.

Example Ex8. The device according to one or more of Ex1 to Ex7, wherein the substrate is disposed between the first and second electrical contacts and serves as a dielectric positioned therebetween, and the substrate is a rigid structure or a flexible structure.

Example Ex9. The device according to Ex8, wherein the substrate comprises a printed circuit board (PCB).

Example Ex10. The device according to one or more of Ex1 to Ex9, wherein the substrate comprises an over-molded polymeric element.

Example Ex11. The device according to one or more of Ex1 to Ex10, wherein the removal handle comprises a metallic tube through which the first and second electrical conductors extend, and the metallic tube is configured as a radiating element of an antenna of the ear-wearable electronic device.

Example Ex12. The device according to one or more of Ex1 to Ex10, wherein the removal handle comprises a tube through which the first and second electrical conductors extend, and a metallic sleeve is disposed over the tube and is configured as a radiating element of an antenna of the ear-wearable electronic device.

Example Ex13. The device according to one or more of Ex1 to Ex12, comprising rectifying circuitry coupled to the first and second electrical contacts.

Example Ex14. The device according to one or more of Ex1 to Ex13, wherein the device defines an ITE, ITC, CIC or IIC type hearing device.

Example Ex15. An ear-wearable electronic device comprises a shell and a faceplate connected to the shell, electronic circuitry and a rechargeable power source respectively disposed in the shell, a removal handle connected to the faceplate, first and second electrical conductors extending along the removal handle and comprising first and second proximal ends coupled to the electronic circuitry, and an electrical contact module disposed at a distal end of the removal handle. The electrical contact module comprises a substrate, a first electrical contact mounted on, or supported by, the substrate and coupled to a first distal end of the first electrical conductor, a second electrical contact mounted on, or supported by, the substrate and coupled to a second distal end of the second electrical conductor, and the first and second electrical contacts configured as touch sensor contacts and charge contacts for charging the rechargeable power source.

Example Ex16. The device according to Ex15, wherein the shell has a uniquely-shaped outer surface that corresponds uniquely to an ear geometry of a wearer of the device.

Example Ex17. The device according to Ex15 or Ex16, wherein the electrical contact module is configured as a single function touch sensor.

Example Ex18. The device according to Ex15 or Ex16, wherein the electrical contact module is configured as a multiple function touch sensor.

Example Ex19. The device according to one or more of Ex15 to Ex18, wherein the device defines an ITE, ITC, CIC or IIC type hearing device.

Example Ex20. A method implemented using an ear-wearable electronic device comprising a shell and a faceplate connected to the shell comprises, with the device deployed in the wearer's ear, activating a switch of an electrical contact module disposed at a distal end of a removal handle connected to the faceplate in response to contact between at least one of the wearer's fingers and the electrical contact module, and with the device removed from the wearer's ear, recharging a rechargeable power source of the device via the electrical contact module.

Example Ex21. The method according to Ex20, comprising magnetically orienting the electrical contact module on a charging unit in a preferred charging orientation.

Example Ex22. The method according to Ex20 or Ex21, wherein the switch defines a single function switch.

Example Ex23. The method according to Ex20 or Ex21, wherein the switch defines a multiple function switch.

Example Ex24. The method according to one or more of Ex20 to Ex23, wherein the device defines an ITE, ITC, CIC or IIC type hearing device.

FIG. 1 shows a representative ear-wearable electronic device 5 comprising a shell 11 having a uniquely-shaped outer surface that corresponds uniquely to an ear geometry of a wearer of the device 5. In some implementations, the shell 11 can have a standard shape useful by a population of wearers. Although not shown in FIG. 1 (but see FIG. 5), electronic circuitry and a power source are respectively disposed in the shell 10. In some embodiments, the power source comprises a rechargeable power source, such as a lithium-ion battery. In other embodiments, the power source comprises a non-rechargeable power source, such as a zinc-air battery (e.g., a 312 zinc-air battery). A faceplate 12 is disposed at a proximal end of the shell 10. A multi-function removal handle 14 extends from the faceplate 12 in an outer ear direction.

The multi-function removal handle 14 includes an elongated tube 16 and an electrical contact module 20 disposed at a distal end 19 of the tube 16. In some implementations, the electrical contact module 20 is configured as a user-actuatable touch sensor or switch. In other implementations, the electrical contact module 20 includes charge contacts configured to facilitate charging of a rechargeable power source of the device 5 when the charge contacts electrically couple to an external charging unit. In further implementations, the electrical contact module 20 is configured as a user-actuatable touch sensor or switch and, in addition, provides charge contacts for electrically coupling to a charging unit.

FIGS. 2, 3A-3B, and 4A-4B illustrate various components of the multi-function removal handle 14 shown in FIG. 1 in accordance with any of the embodiments disclosed herein. As shown, the electrical contact module 20 is disposed at a distal end 19 of the tube 16 of the multi-function removal handle 14.

According to some embodiments, and as shown in FIG. 3B, the tube 16 includes a metal core tube 21 covered by a sheath of polymeric material 23 over-molded onto the core tube 21. In some implementations, the tube 16 is a metal weave core tube. Enhanced sheer and tensile strength are derived from this metal lattice. The outer jacket of polymeric material includes blunts formed on each end to anchor the multi-function removal handle 14 in the faceplate 12 and mechanically lock onto a substrate (e.g., PCB 22) or other structure of the electrical contact module 20. In some implementations, a polymeric tube can be used instead of the metal core tube 21.

In some embodiments, the metal core tube 21 is configured to serve as a radiating element of an antenna of the ear-wearable electronic device 5. In the case of a metal weave core tube, such as that shown in FIG. 3B, the tightness of the weave (or spiral in some configurations) enables radiofrequency (RF) radiation to bridge these small gaps, which results in an antenna structure having an effective size close to the outer diameter of the removal handle 14 (in contrast to the size of a small wire contained inside a polymeric tube as in the case of a conventional implementation). Antenna performance is unaffected by processes (e.g., electrical activity) inside the metal core tube 21 as radiation propagation is directed outwardly from the outer surface of the metal core tube 21. The antenna comprising the metal core tube 21 can be coupled to a communication device (e.g., communication device 172 shown in FIG. 5) of the ear-wearable electronic device 5 via a wire arrangement, an inductive coupling arrangement, or a magnetic coupling arrangement.

In some embodiments, and with continued reference to FIG. 3B, item 23 can be implemented as a conductive (e.g., metal) sleeve which extends along all or a portion of the removal handle 14. A dielectric material can be disposed between the metal core tube 21 and the conductive sleeve 23. In other embodiments, item 21 can be implemented as a polymeric tube and item 23 can be implemented as the conductive sleeve 23 which extends along all or a portion of the removal handle 14. A protective coating can be disposed on the conductive sleeve 23 to prevent oxidation. The conductive sleeve 23 is configured to serve as a radiating element of an antenna of the ear-wearable electronic device 5. The antenna comprising the conductive sleeve 23 can be coupled to a communication device of the ear-wearable electronic device via a wire arrangement, an inductive coupling arrangement, or a magnetic coupling arrangement.

It is noted that the embodiments incorporating the conductive sleeve 23 discussed above can be implemented in a receiver-in-canal (MC) cable. The MC cable can have a construction similar to that described above with reference to FIG. 3B. For example, item 21 can be implemented as a polymeric tube with wires extending within the tube between a behind-ear hearing device unit and a receiver disposed at a distal end of the polymeric tube. A conductive sleeve 23 extends along at least a portion of the RIC cable. The conductive sleeve 23 is configured to serve as a radiating element of an antenna of the RIC device. The antenna comprising the conductive sleeve 23 can be coupled to a communication device of the MC device via a wire arrangement, an inductive coupling arrangement, or a magnetic coupling arrangement.

With reference to FIG. 3A, the electrical contact module 20 includes a substrate in the form of PCB 22, a first electrical contact 24, and a second electrical contact 26. The first electrical contact 24 is mounted on a first surface of the PCB 22 and coupled to a first distal end of the first electrical conductor 25. The second electrical contact 26 is mounted on a second surface of the PCB 22 and coupled to a second distal end of the second electrical conductor 27.

As shown in FIG. 4, first and second electrical conductors 25, 27 extend along the interior of the tube 16. The first and second electrical conductors 25, 27 comprise first and second proximal ends which are coupled to electronic circuitry disposed within the shell 10. The first and second electrical conductors 25, 27 extend up the tube 16 and to the PCB 22 where they are soldered to electrical pads 30, 32. The pads 30, 31 are connected to traces which respectively terminate on the first and second electrical contacts 24, 26.

Figure 2:
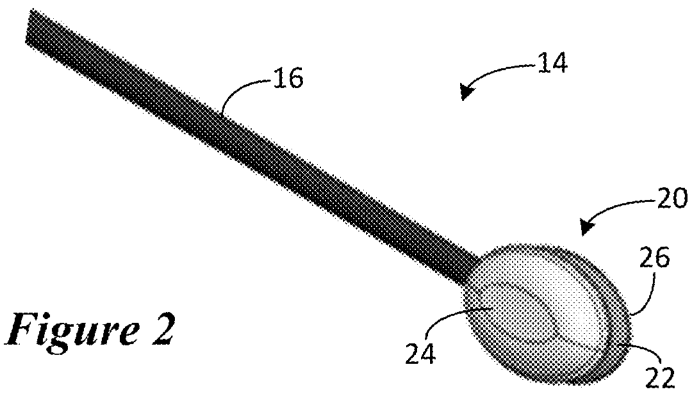
FIG. 2 shows a multi-function removal handle in accordance with any of the embodiments disclosed herein.

As can be seen in FIGS. 2 and 3A, the PCB 22 is disposed between the first and second electrical contacts 24, 26 and serves as a dielectric positioned therebetween. In some implementations, the PCB 22 is a rigid structure (e.g., FR-4). In other implementations, the PCB 22 is a flexible structure (e.g., a flexible polymeric (e.g., polyimide) printed circuit board). In some embodiments, the electrical contact module 20 includes a third electrical contact mounted on a third surface of the PCB 22. In such embodiments, the PCB 22 can have at least three surfaces (e.g., planar surfaces) each of which supports one of the three electrical contacts. The PCB 22 is disposed between the first, second, and third electrical contacts and serves as a dielectric positioned therebetween.

According to some embodiments, the electrical contact module 20 includes a magnet 34 mounted on a specified surface of the PCB 22. The magnet 34 is configured to magnetically interact with a magnet of an external charging unit so as to self-orient the electrical contact module 20 when placed on the charging unit. For example, when the wearer places the ear-wearable electronic device 5 in a charging unit, such as a travel charge unit, the electrical contact module can automatically flip to the correct magnetic polarity (orientation) which ensures that the correct electrical polarity is achieved for charging. It is noted that the charging unit can have recessed portions on the base and lid configured to receive the device 5 and the multi-function removal handle 14. When the lid is closed, a gentle (continuous) squeeze force can be applied to the first and second electrical contacts 24, 26 which is interpreted by the device 5 as a charging command. Removal of the device 5 from the charger terminates the squeeze force, thereby terminating the charging procedure.

Figure 4A:
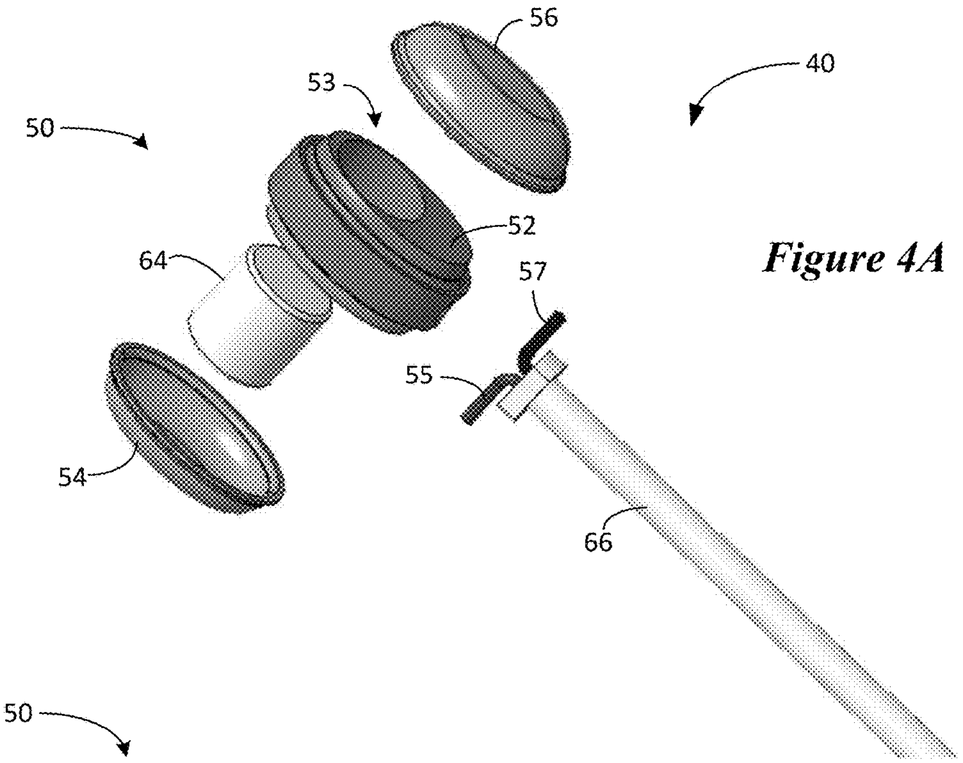
FIG. 4A shows various components of a multi-function removal handle in accordance with any of the embodiments disclosed herein.
Figure 4B:
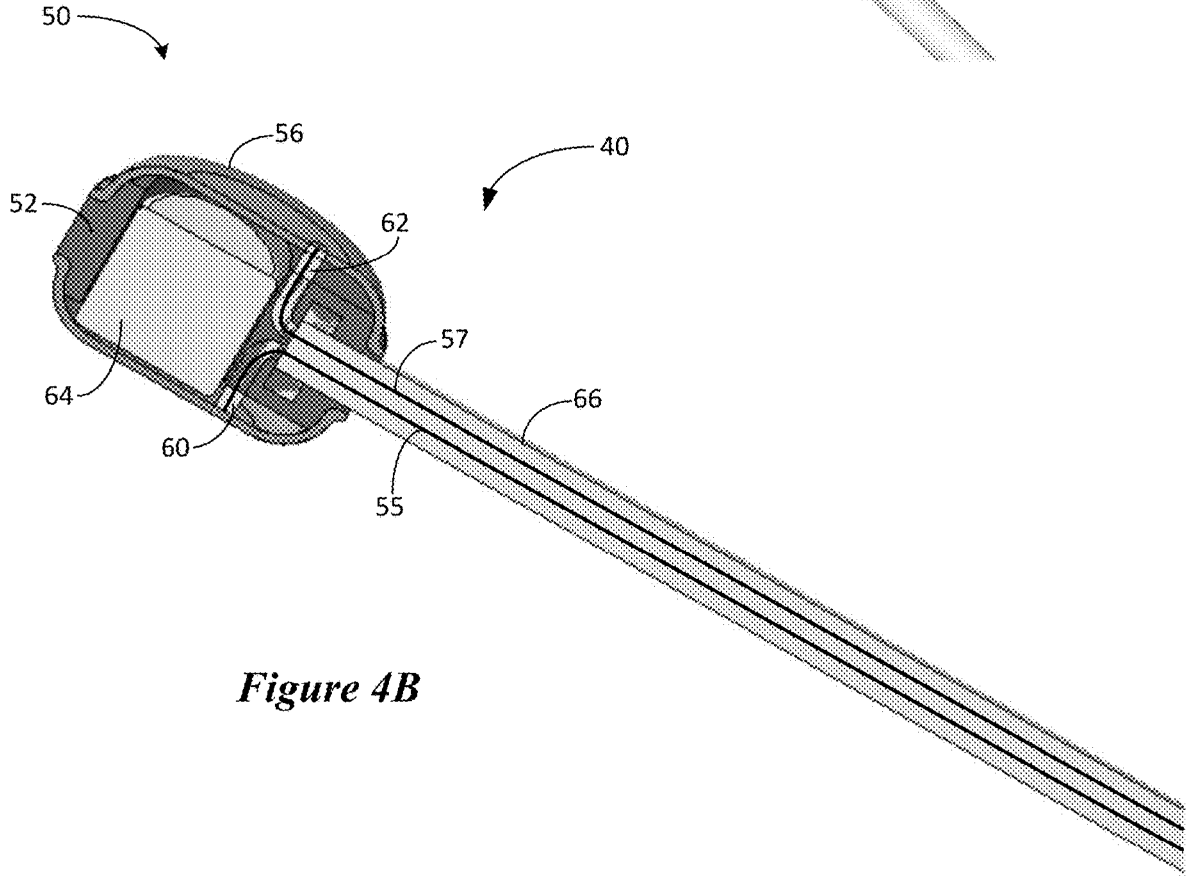
FIG. 4B shows various components of a multi-function removal handle in accordance with any of the embodiments disclosed herein.

FIGS. 4A and 4B illustrate a multi-function removal handle in accordance with any of the embodiments disclosed herein. The multi-function removal handle 50 includes an electrical contact module 50 which comprises a polymeric substrate 52, a first electrical contact 54, and a second electrical contact 56. The polymeric substrate 52 can be an over-molded polymeric element. The polymeric substrate can include a void 53 (e.g., a cylindrical void). The first electrical contact 54 is mounted on, or supported by, a first surface of the substrate 52. The first electrical contact 54 is coupled to a first distal end of a first electrical conductor 55 via electrical pad 60. The second electrical contact 56 is mounted on, or supported by, a second surface of the substrate 52. The second electrical contact 56 is coupled to a first distal end of a second electrical conductor 57 via electrical pad 62.

As shown in FIG. 4B, first and second electrical conductors 55, 57 extend along the interior of the tube 66. The first and second electrical conductors 55, 57 comprise first and second proximal ends which are coupled to electronic circuitry disposed within the shell 10. The first and second electrical conductors 55, 57 extend up the tube 66 and to the substrate 52 where they are soldered to electrical pads 60, 62. The pads 60, 62 can be connected to traces which respectively terminate on the first and second electrical contacts 54, 56.

As is shown in FIG. 4A, the substrate 52 is disposed between the first and second electrical contacts 54, 56 and serves as a dielectric positioned therebetween. In some implementations, the substrate 52 is a rigid over-molded polymeric structure. In other implementations, the substrate 52 is a flexible over-molded polymeric structure. In some embodiments, the electrical contact module 50 includes a third electrical contact mounted on, or supported by, a third surface of the substrate 52. In such embodiments, the substrate 52 can have at least three surfaces (e.g., planar surface) each of which supports one of the three electrical contacts. The substrate 52 is disposed between the first, second, and third electrical contacts and serves as a dielectric positioned therebetween.

According to some embodiments, the electrical contact module 50 includes a magnet 64 disposed on or in the substrate 52. As shown, the magnet 64 is disposed within a void 53 of the substrate 52. Although shown to be cylindrical, the magnet 64 and void 53 can have any shape (e.g., a polygonal shape). As in other embodiments, and as previously discussed, the magnet 64 is configured to magnetically interact with a magnet of an external charging unit so as to self-orient the electrical contact module 50 when placed on the charging unit.

In some implementations, the electrical contact module 20, 50 serves as a single function touch switch which execute a specified function (e.g., on/off, volume change cycling between low and high, cycling through memory settings). In other implementations, the electrical contact module 20, 50 serves as a multiple function touch switch which executes a multiplicity of specified functions (see examples below).

Figure 5:
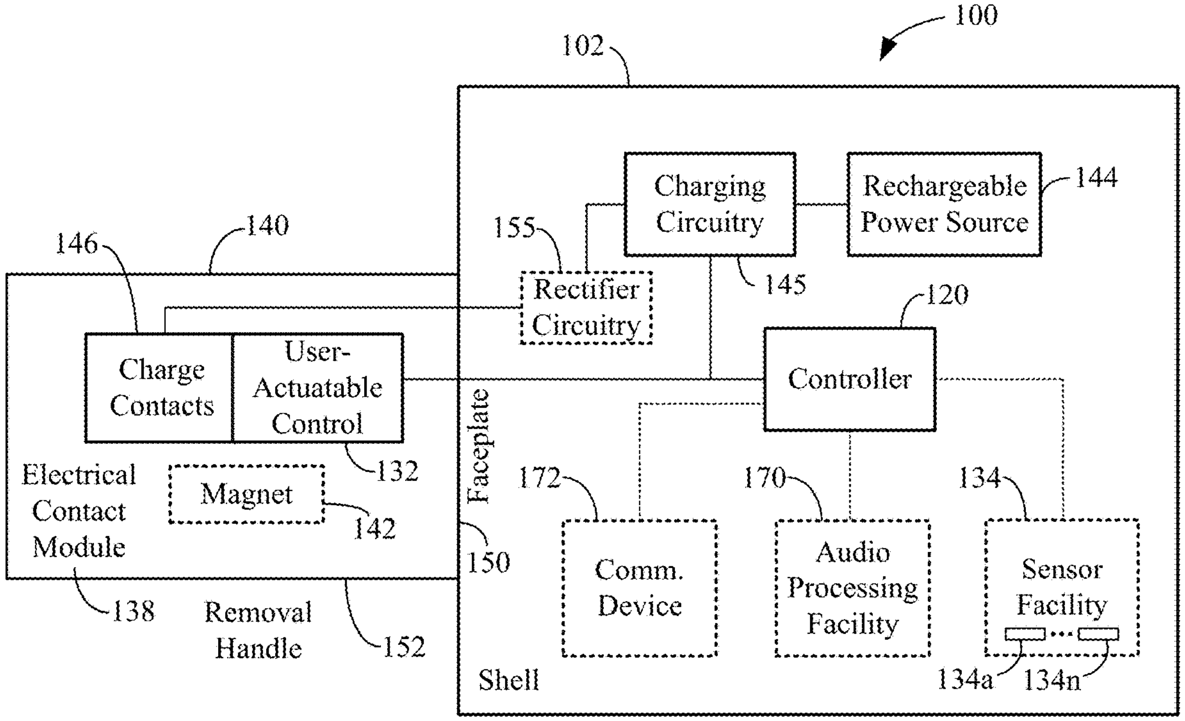
FIG. 5 is a block diagram of an ear-wearable electronic device which includes a multi-function removal handle configured to serve as one or both of a user-actuatable control comprising a touch sensor and charge contacts in accordance with any of the embodiments disclosed herein.
Figure 6:
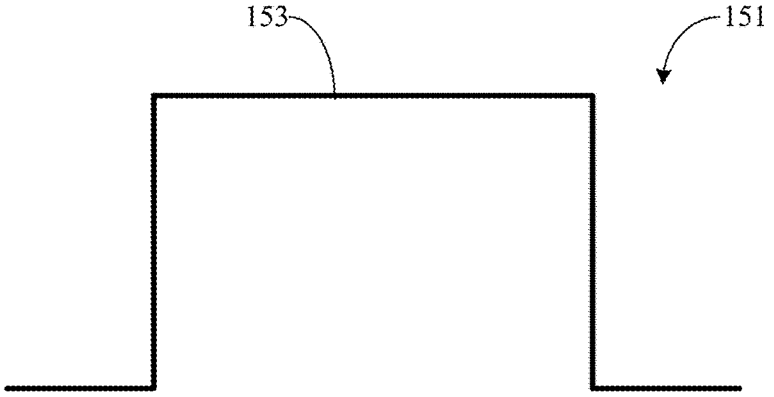
FIG. 6 shows a touch sensor of an ear-wearable electronic device and an output signal generated by the touch sensor, the touch sensor comprising first and second charge contacts of a multi-function removal handle in accordance with any of the embodiments disclosed herein.

In accordance with any of the embodiments disclosed herein, and with reference to FIGS. 5 and 6, the ear-wearable electronic device 100 can be configured as a hearing device or a hearable which includes an audio processing facility 170. The audio processing facility 170 can include audio signal processing circuitry, a speaker, receiver or other acoustic transducer, and optionally one or more microphones. In accordance with any of the embodiments disclosed herein, the device 100 can be implemented as a physiologic (e.g., biometric) monitoring device and include a sensor facility 134. When implemented for physiologic monitoring (e.g., via a heart rate sensor, blood oxygen saturation sensor, respiration sensor, fall detector), the device 100 can include or exclude (e.g., be devoid of) the audio processing facility 170.

The device 100 can also incorporate a communication device 172 configured to effect communications between two of the devices 100 and/or with an external electronic device, system, and/or the cloud. The communication device 172 can include one or both of an RF transceiver/antenna and/or an NFMI/NFC transceiver/antenna. For example, the communication device 172 can include one or more radios that conform to an IEEE 802.11 (e.g., WiFi®) or Bluetooth® (e.g., BLE, Bluetooth®) specification, for example. It is understood that the device 100 can employ other radios, such as a 900 MHz radio. In addition, or alternatively, the device 100 can include a near-field magnetic induction (NFMI) sensor (e.g., an NFMI transceiver coupled to a magnetic antenna) for effecting short-range communications (e.g., ear-to-ear communications, ear-to-kiosk communications). The communication device 172 is coupled to an antenna of the device 100, such as a metallic tube antenna or a metallic sleeve antenna as disclosed herein.

The shell 102 of the device 100 is configured to contain or support a number of components including some or all of those shown in FIG. 5. The device 100 also includes a multi-function removal handle 140 connected to, and extending from, the shell 102. The multi-function removal handle 140 shown in FIG. 5 is preferably the same as the multi-function removal handle 14 shown in FIGS. 1-4.

The multi-function removal handle 140 includes a tube 152 having a proximal end connected to the faceplate 150 and a distal end configured to support an electrical contact module 138. In addition to serving as a pull cord, the multi-function removal handle 140 can include charge contacts 146 according to various embodiments. In other embodiments, in addition to serving as a pull cord, the multi-function removal handle 140 can include a user-actuatable control 132, such as a touch sensor. In further embodiments, in addition to serving as a pull cord, the multi-function removal handle 140 can include charge contacts 146 and the user-actuatable control 132.

According to embodiments in which the electrical contact module 138 includes charge contacts 146, the charge contacts 146 are electrically coupled to charging circuitry 145 disposed in the shell 102. The charging circuitry 145 is coupled to a rechargeable power source 144, such as a lithium-ion battery. In some implementations, the charge contacts 146 are coupled to rectifier circuitry 155 which, in turn, is coupled to the charging circuitry 145. The rectifier circuitry 155 can be configured according to the schematics shown in FIGS. 8 and 9. The rectifier circuitry 155 provides for any orientation of the charge contacts 146 (e.g., either-way OK circuitry) when electrically coupled to corresponding electrical contacts of an external charging unit.

In some implementations (e.g., those in which rectifier circuitry may not be included), a magnet 142 is disposed in the electrical contact module 138. The magnet 142 is configured to magnetically interact with a magnet of a charging unit so as to self-orient the electrical contact module 138 relative to electrical contacts of the charging unit. When the wearer places the ear-wearable electronic device 100 in a charging unit, such as a travel charge unit for example, the electrical contact module 138 can automatically flip to the correct magnetic polarity (orientation) which ensures that the correct electrical polarity is achieved for charging the rechargeable power source 144.

A controller 120 is operatively coupled to the charging circuitry 145 and other components of the device 100. The charge contacts 146 typically comprise at least one positive contact and at least one negative or ground contact exposed on an exterior surface of the electrical contact module 138 (e.g., see electrical contacts 24 and 26 shown in FIG. 3). When recharging the rechargeable power source 144, the device 100 is typically placed in a charging unit comprising positive and negative charge contacts which electrically couple to corresponding positive and negative charge contacts 146 of the electrical contact module 138. The charging circuitry 145 of the device 100 cooperates with charging circuitry of the charging unit to charge the rechargeable power source 144. The charging circuitry 145 of the device 100 can be configured to cooperate with the charging unit in accordance with the representative examples disclosed in commonly owned, co-pending U.S. Published Patent Application No. 2019/0386,498, which is incorporated herein by reference in its entirety.

The electrical contact module 138 of device 100 can also include a user-actuatable control 132 (e.g., a touch sensor or switch). The user-actuatable control 132 comprises or is coupled to the charge contacts 146. It is noted that, other than the charge contacts and electrical conductors coupled to same, some or all of the circuitry of the user-actuatable control 132 can be disposed in the shell 102.

The electrical contact module 138 can be implemented as a sensor comprising the charge contacts 146 and configured to sense for a change in one or any combination of impedance, conductance, resistance, and electrodermal activity. More particularly, the electrical contact module 138 can be implemented as a sensor that uses the charge contacts 146 to sense for a change in one or any combination of impedance, conductance, resistance, and electrodermal activity due to the presence of the wearer's finger or fingers at the electrical contact module 138 (referred to herein as a touch input).

In accordance with any of the embodiments disclosed herein, and as shown in FIG. 6, the electrical contact module 138 is configured to sense contact between the wearer's finger or fingers and the charge contacts 146 as a touch input. The user-actuatable control 132 generates a touch signal 151 in response to the touch input sensed by the electrical contact module 138. The representative touch signal 151 shown in FIG. 2 is a pulse 153 (e.g., a voltage or current pulse) generated by signal processing circuitry of the user-actuatable control 132. The user-actuatable control 132 communicates the pulse 153 or an output signal corresponding to the pulse 153 to the controller 120. The controller 120 is configured to initiate a device function or operation or a plurality of device functions or operations in response to the touch input pulse 153 or a sequence of touch input pulses 153.

Although a single pulse 153 is shown in the representative example of FIG. 6, it is understood that multiple pulses 153 can be generated by the user-actuatable control 132 and operated on by the controller 120 to perform a number of different operations. Multiple pulses 153 can be generated in response to multiple touches to the electrical contact module 138. The pulse width of the pulse or pulses 153 can be varied so as to correspond to individual, or a sequence of, short and long touches. The number, duration, and/or time separation of wearer touches to the electrical contact module 138 and corresponding pulses 153 can correspond to a number of different device commands or wearer inputs.

For example, a single touch or pinch to the electrical contact module 138 followed by a long pause (e.g., a single tap input) can be interpreted by the controller 120 as corresponding to a volume up command. Two touches or pinches to the electrical contact module 138 separated in time by a short pause (e.g., a double tap input) can be interpreted by the controller 120 as corresponding to a volume down command. A single long duration touch or pinch to the electrical contact module 138 can be interpreted by the controller 120 as corresponding to a communication device (e.g., telecoil, RF transceiver) activation command. Two long duration touches or pinches to the electrical contact module 138 can be interpreted by the controller 120 as corresponding to a communication device deactivation command.

Multiple commands for a given device function or operation can also be input to the device 100 via the electrical contact module 138. For example, a short duration touch followed by a long duration touch or pinch applied to the electrical contact module 138 can initiate a hearing aid memory selection routine. Once initiated, application of individual short duration touches or pinches to the electrical contact module 138 can allow the wearer to step/cycle through a number of different hearing aid memories, each of which activates different hearing aid settings (e.g., speech enhancement settings, noise reduction settings, ambient environment classification settings). It is understood that these and other examples of hearing device functions described herein represent non-exhaustive, non-limiting examples of device commands that can be initiated by a wearer using a user-actuatable control facility disclosed herein.

Figure 7:
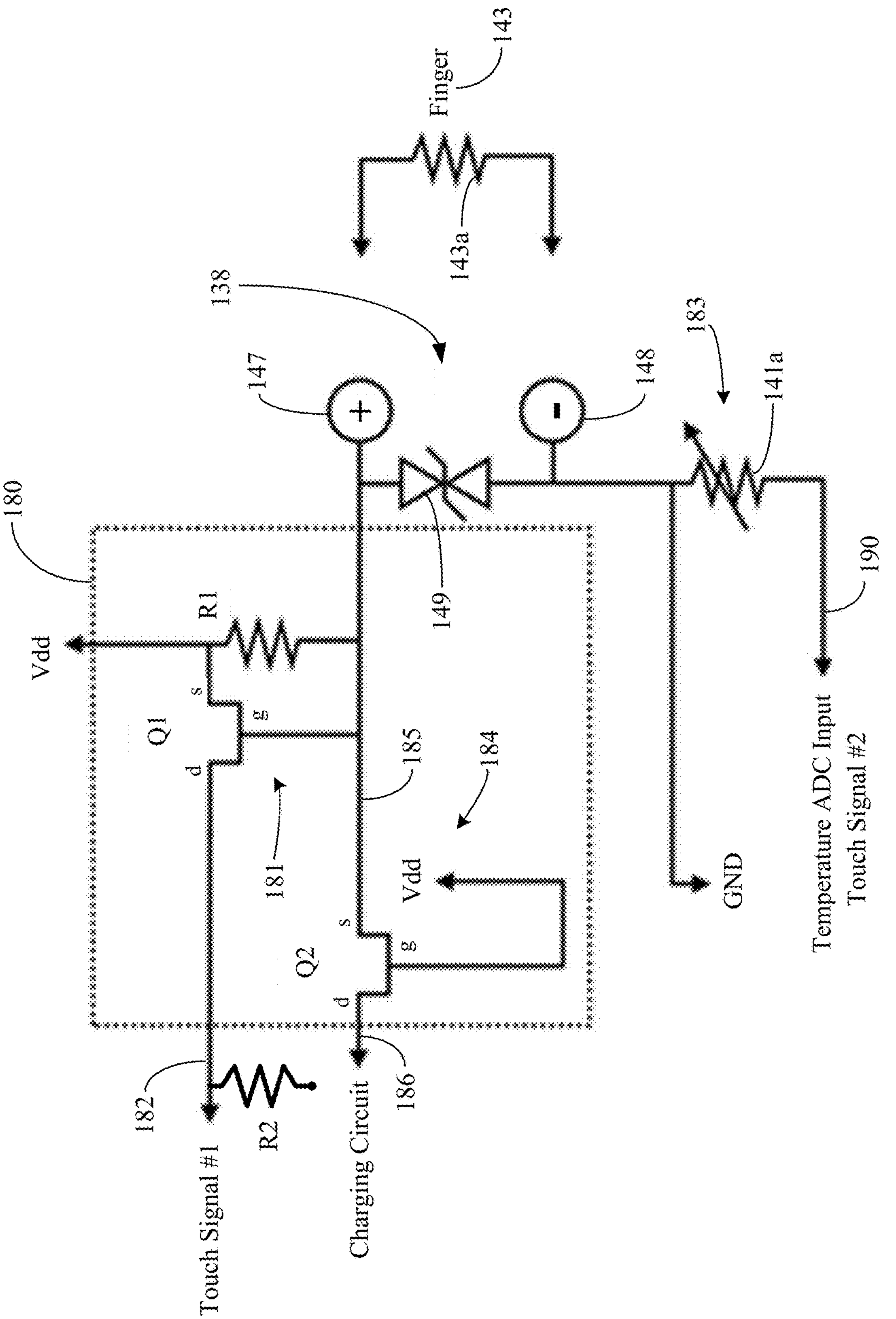
FIG. 7 illustrates a touch detection circuit integral or coupled to a user-actuatable control of an ear-wearable electronic device in accordance with any of the embodiments disclosed herein.

FIG. 7 illustrates a touch detection circuit 180 integral or coupled to a user-actuatable control 132 of an ear-wearable electronic device 100 in accordance with any of the embodiments disclosed herein. Typically, some or all of the components of the touch detection circuit 180 (other than the electrical contacts and corresponding electrical conductors) are disposed in the shell 102 of the device 100, given the limited space of the multi-function removal handle 140. The touch detection circuit 180 can be implemented as an ASIC, such as a 4-pin ASIC. The components used to construct the touch detection circuit 180 are widely available and inexpensive, and the circuit 180 can be less expensive than a single mechanical switch.

The touch detection circuit 180 is electrically coupled to positive and negative contacts 147, 148 of the electrical contact module 138. The touch detection circuit 180 includes a first section 181 configured to electrically sense contact between a wearer's finger(s) 143 and the positive and negative contacts 147, 148 of the electrical contact module 138. The first section 181 includes a first field effect transistor (FET) Q1, such as a PMOS FET, with a gate, g, coupled to a charging circuit line 185 connected to positive contact 147. A source, s, of Q1 is coupled to a voltage source having a voltage of Vdd (a battery voltage). A drain, d, of Q1 is coupled to an output 182 over which a Touch Signal #1 can be communicated to the user-actuatable control 132 and/or controller 120 of the device 100. The first section 181 also includes a resistor R1 having a relatively high resistance, such as 10 MΩ, coupled between the charging circuit line 185 and the source voltage Vdd line. It is noted that a pulldown resistor R2 is typically connected to the output 182 for sensing Touch Signal #1, but the resistor R2 need not be part of the touch detection circuit 180.

A second section 183 of the touch detection circuit 180 can be included in some implementations or excluded in others. The second section 183 includes a thermistor 141*a* coupled to the negative or ground contact 148. The thermistor 141*a* can be a component of the electrical contact module 138 and configured to thermally sense contact or near-contact between a wearer's finger 143 and the electrical contact module 138. A third section 184 of the touch detection circuit 180 includes a second field effect transistor (FET) Q2, such as a PMOS FET, with a gate, g, coupled to voltage source Vdd, a source, s, coupled to the charging circuit line 185, and a drain, d, coupled to a charging circuit (e.g., a power management IC of charging circuitry 145) of the device 100.

An ESD (electrostatic discharge) or TVS (transient voltage suppression) diode 149 can be connected between the positive and negative contacts 147, 148 to prevent damage to, or unintentional activation of, the circuit 180 in response to static discharge from a user's finger 143. The ESD/TVS diode 149 preferably has a very low leakage current to avoid artificially pulling the gate of Q1 low.

When a wearer touches the electrical contact module 138, the wearer's finger acts as a high impedance (e.g., about 10 kΩ to 1MΩ) applied across the charge contacts 147, 148. The application of this high impedance across the charge contacts 147, 148 pulls the gate, g, of Q1 low, thereby turning on Q1. Charge contact 147 is pulled up to the source voltage Vdd. Turning on Q1 results in a voltage signal equal to Vdd to be communicated to the output 182 as Touch Signal #1.

The second FET, Q2, is configured to prevent a touch event at the electrical contacts 147, 148 from being incorrectly interpreted as a charging event. A charging event can be initiated in response to application of a charging voltage across charge contacts 147, 148 that exceeds the source voltage, Vdd, by at least the threshold voltage, $Vgs_{th}$, of Q2. For example, the charging voltage (e.g., ~5 V) that turns on Q2 for charging is greater than Vdd (e.g., 4.0 V)+$Vgs_{th}$ (e.g., 0.5 V). In other words, the source voltage, Vdd, must be less than the charge voltage, Vchg, minus the threshold voltage, $Vgs_{th}$, of Q2 (e.g., $Vdd<Vchg-Vgs_{th}$).

In some embodiments, the electrical contact module 138 can include a temperature sensor which can enhance the accuracy of touch detections (e.g., reduce or eliminate false detections as a separate, corroborating touch sensor). A thermistor 141*a* can be coupled to the negative charge contact 148, which is the low thermal impedance output side of the circuit 180. When the wearer's finger 143 makes contact or near-contact with the electrical contact module 138, the thermistor 141*a* immediately changes in temperature and quickly approaches the temperature of the user's finger 143. This rapid change in temperature results in a corresponding change in an analog signal which is communicated from an output 190 of the thermistor 141*a* (corresponding to Touch Signal #2) to a temperature ADC input of the user-actuatable control 132 and/or controller 120 of the device 100. The controller 120 can use Touch Signal #1 (electrical touch signal) and Touch Signal #2 (thermal touch signal) for implementing any of the touch detection techniques disclosed herein. It is noted that, unlike capacitive touch solutions, water and hair will not affect the thermistor 141*a* (or other temperature sensor) in the same way the finger will.

To further combat false positives and make the electrical contact module 138 more robust, an IMU (disposed in the shell) or a capacitive touch sensor can be used as an auxiliary sensor. In the case of the IMU, a double tap to the faceplate of the shell could be required to activate the components of the electrical contact module 138 (e.g., thermistor 141*a* or other temperature touch sensor). In the case of a capacitive touch sensor 134*d*, for example, a touch would be recognized if both the capacitance changed as well as the temperature. In some configurations, the charge contacts 146 can be used as electrodes coupled to typical skin on/off circuits or to measure the galvanic skin resistance of the wearer's finger if it can be assured that the touch is applied between the charge contacts 147, 148.

Figure 8:
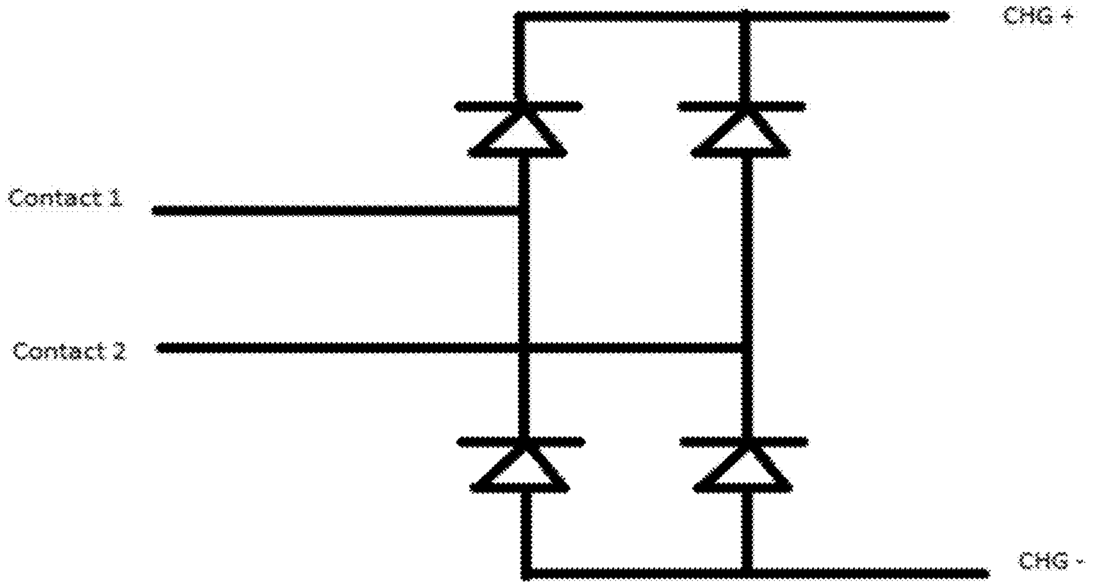
FIG. 8 is a schematic of rectifier circuitry for electrically connecting charge contacts of a multi-function removal handle and charging contacts of a charger unit in accordance with any of the embodiments disclosed herein.
Figure 9:
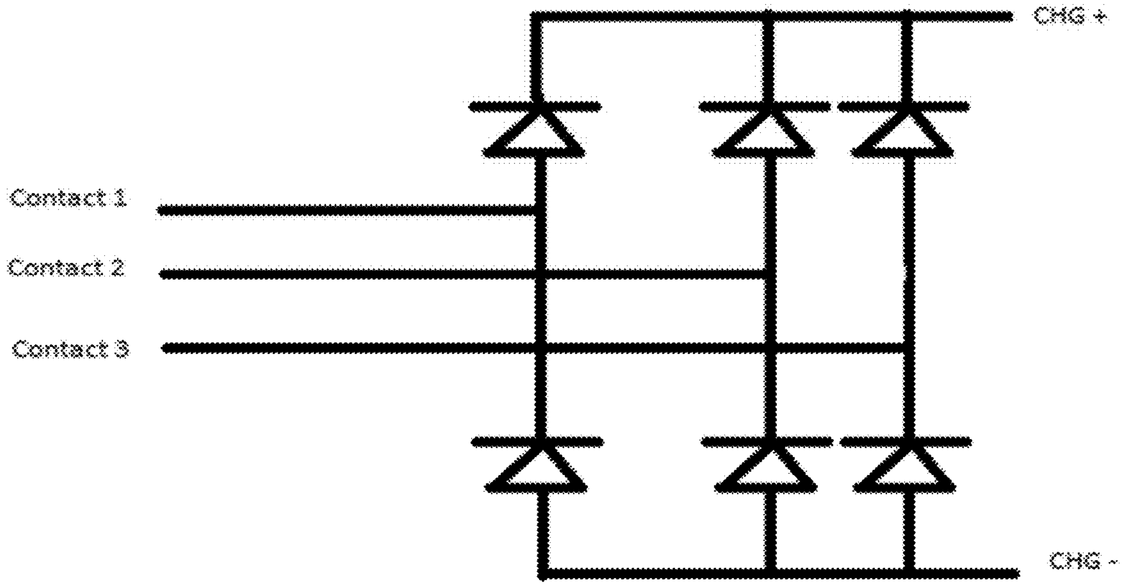
FIG. 9 is a schematic of rectifier circuitry for electrically connecting charge contacts of a multi-function removal handle and charging contacts of a charger unit in accordance with any of the embodiments disclosed herein.

FIG. 8 shows a two-contact rectifier circuit in which charge contacts 1 and 2 are contacts to the outside world. As can be seen in FIG. 8, the charger pins CHG+ and CHG− retain their polarity as shown irrespective of the orientation of charge contacts 1 and 2 in the charging unit. FIG. 9 shows a three-contact rectifier circuit in which charge contacts 1, 2, and 3 are contacts to the outside world. As can be seen in FIG. 9, the charger pins CHG+ and CHG− retain their polarity as shown irrespective of the orientation of charge contacts 1, 2, and 3 in the charging unit.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-wearable electronic device, comprising:
- a shell and a faceplate connected to the shell;
- electronic circuitry and a rechargeable power source respectively disposed in the shell;
- a removal handle having a proximal end connected to the faceplate, the removal handle comprising an elongated tubular structure;
- first and second electrical conductors extending along the removal handle and comprising first and second proximal ends coupled to the electronic circuitry; and
- an electrical contact module disposed at a terminus of a distal end of the elongated tubular structure, the electrical contact module comprising:
  - a substrate;
  - a first electrical contact mounted on, or supported by, the substrate and coupled to a first distal end of the first electrical conductor; and
  - a second electrical contact mounted on, or supported by, the substrate and coupled to a second distal end of the second electrical conductor;
  - the first and second electrical contacts defining first and second charge contacts configured to facilitate charging of the rechargeable power source.

2. The device according to claim 1, wherein the electrical contact module defines a user-actuatable switch.

3. The device according to claim 2, wherein the switch defines a single function switch.

4. The device according to claim 2, wherein the switch defines a multiple function switch.

5. The device according to claim 1, wherein:
- the electrical contact module defines a user-actuatable switch, the first and second electrical contacts configured as touch sensor contacts of the user-actuatable switch.

6. The device according to claim 1, comprising a magnet disposed on or in the substrate, wherein the magnet is configured to magnetically interact with a magnet of a charging unit so as to self-orient the electrical contact module on the charging unit.

7. The device according to claim 1, wherein:
- the substrate is disposed between the first and second electrical contacts and serves as a dielectric positioned therebetween; and
- the substrate is a rigid structure or a flexible structure.

8. The device according to claim 7, wherein the substrate comprises a printed circuit board (PCB).

9. The device according to claim 1, wherein the substrate comprises an over-molded polymeric element.

10. The device according to claim 1, wherein:

the elongated tubular structure of the removal handle comprises a metallic tube through which the first and second electrical conductors extend; and the metallic tube is configured as a radiating element of an antenna of the ear-wearable electronic device.

11. The device according to claim 1, wherein the elongated tubular structure of the removal handle comprises a tube through which the first and second electrical conductors extend; and a metallic sleeve is disposed over the tube and is configured as a radiating element of an antenna of the ear-wearable electronic device.

12. The device according to claim 1, comprising rectifying circuitry coupled to the first and second electrical contacts.

13. The device according to claim 1, wherein the device defines an ITE, ITC, CIC or IIC type hearing device.

14. An ear-wearable electronic device, comprising:

a shell and a faceplate connected to the shell;

electronic circuitry and a rechargeable power source respectively disposed in the shell;

a removal handle connected to the faceplate, the removal handle comprising an elongated tubular structure;

first and second electrical conductors extending along the removal handle and comprising first and second proximal ends coupled to the electronic circuitry; and an electrical contact module disposed at a terminus of a distal end of the elongated tubular structure, the electrical contact module comprising:

a substrate;

a first electrical contact mounted on, or supported by, the substrate and coupled to a first distal end of the first electrical conductor;

a second electrical contact mounted on, or supported by, the substrate and coupled to a second distal end of the second electrical conductor; and the first and second electrical contacts configured as touch sensor contacts and charge contacts for charging the rechargeable power source.

15. The device according to claim 14, wherein the shell has a uniquely-shaped outer surface that corresponds uniquely to an ear geometry of a wearer of the device.

16. The device according to claim 14, wherein the electrical contact module is configured as a single function touch sensor.

17. The device according to claim 14, wherein the electrical contact module is configured as a multiple function touch sensor.

18. The device according to claim 14, wherein the device defines an ITE, ITC, CIC or IIC type hearing device.

19. A method implemented using an ear-wearable electronic device comprising a shell and a faceplate connected to the shell, the method comprising:

with the device deployed in the wearer's ear, activating a switch of an electrical contact module disposed at a terminus of a distal end of an elongated, tubular removal handle connected to the faceplate in response to contact between at least one of the wearer's fingers and the electrical contact module; and with the device removed from the wearer's ear, recharging a rechargeable power source of the device via the electrical contact module.

20. The method according to claim 19, comprising magnetically orienting the electrical contact module on a charging unit in a preferred charging orientation.

21. The method according to claim 19, wherein the switch defines a single function switch.

22. The method according to claim 19, wherein the switch defines a multiple function switch.

23. The method according to claim 19, wherein the device defines an ITE, ITC, CIC or IIC type hearing device.

* * * * *